June 2, 1925.
C. S. CRICKMER
1,540,206
BLEEDER FOR LIQUID STORAGE TANKS
Filed Feb. 23, 1924 3 Sheets-Sheet 3
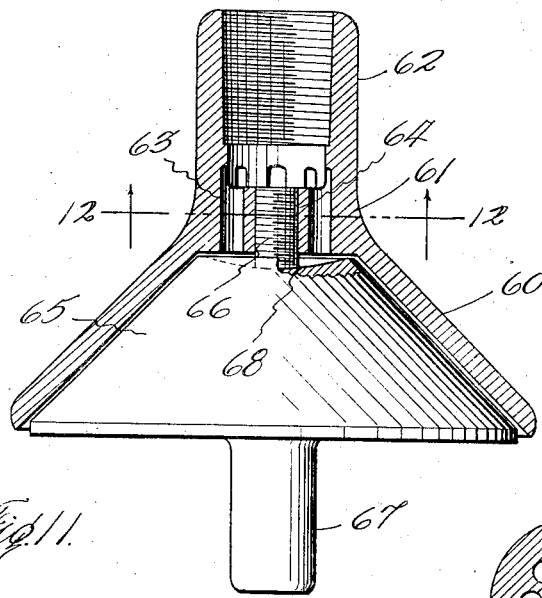
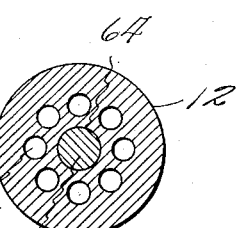
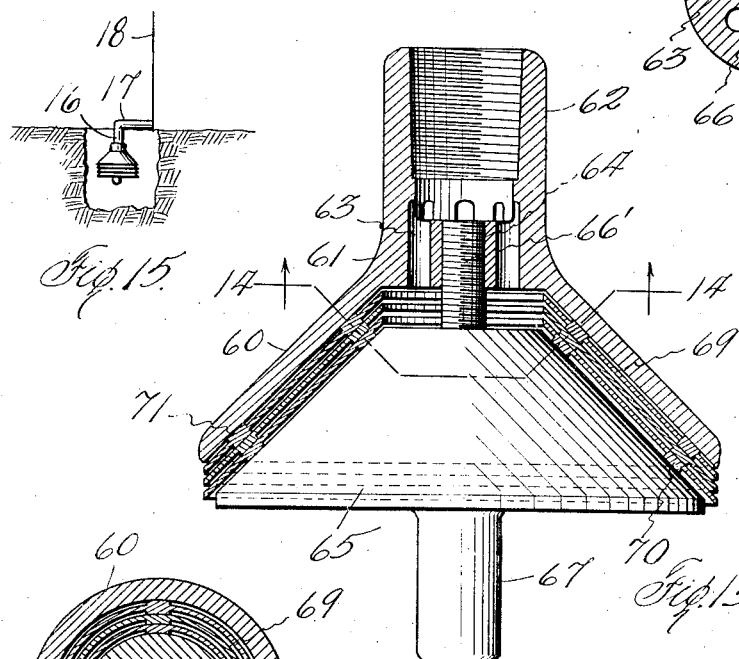
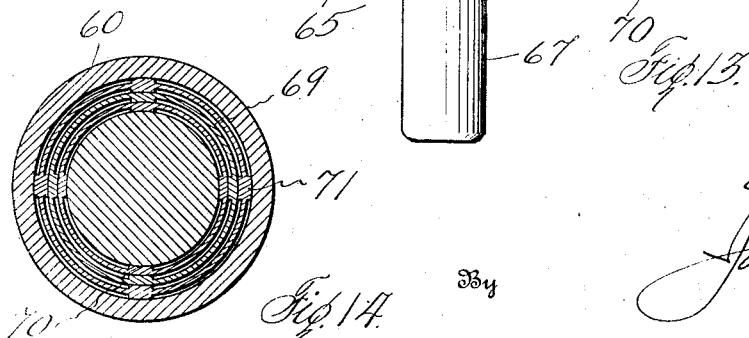
Inventor
C. S. Crickmer
By Jack A. Oehley
Attorney Patented June 2, 1925.

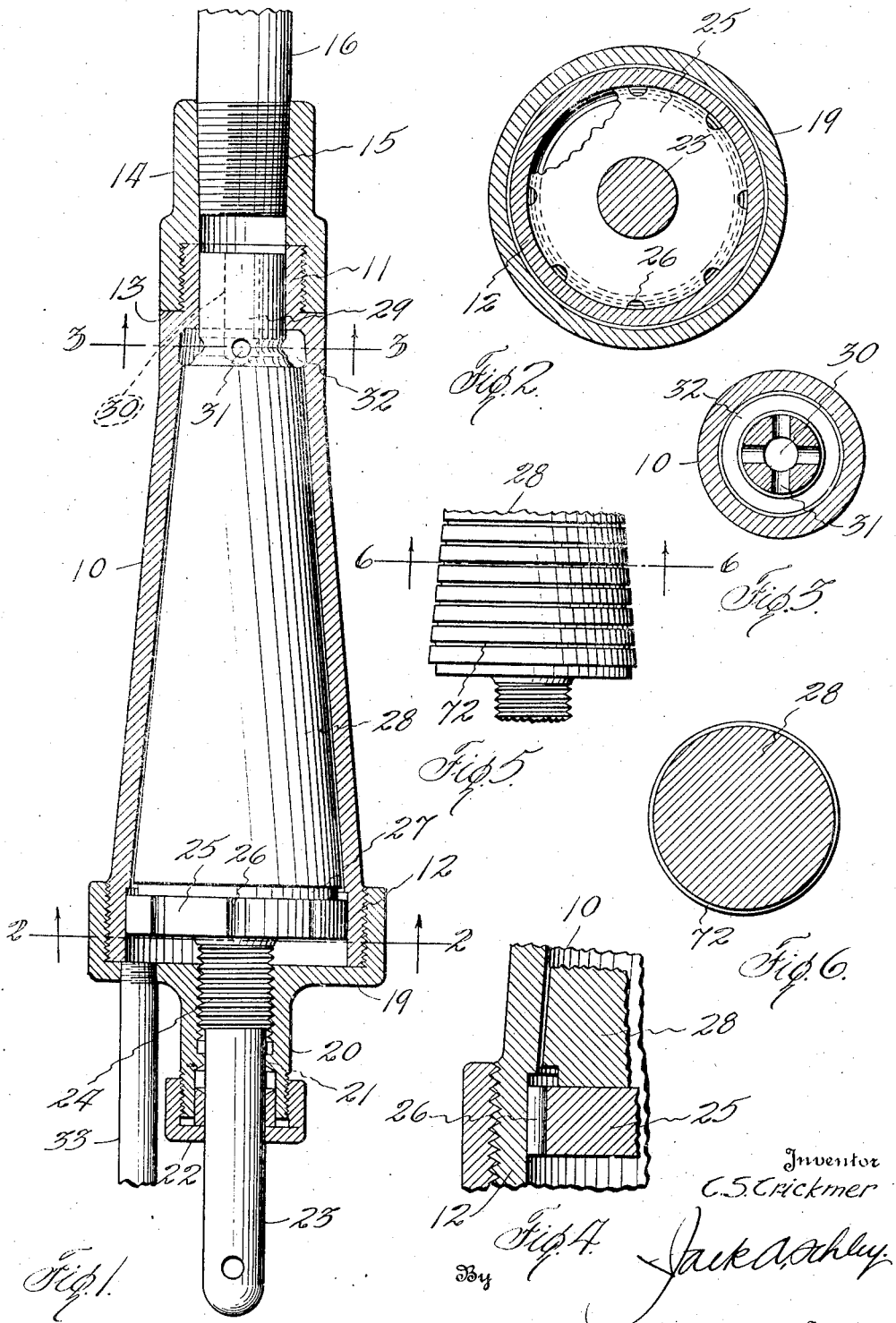

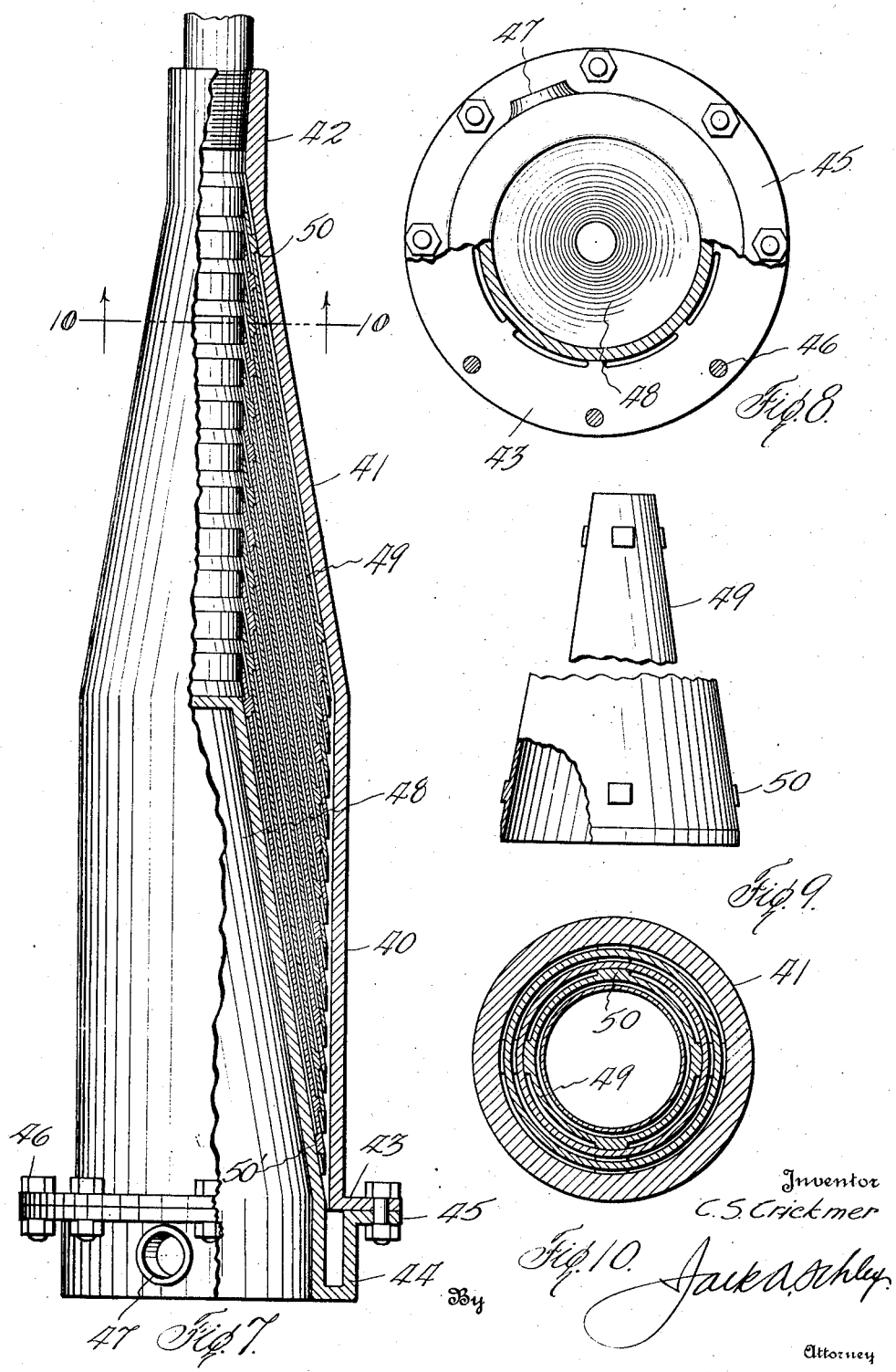

1,540,206

UNITED STATES PATENT OFFICE.

CHARLES S. CRICKMER, OF DALLAS, TEXAS, ASSIGNOR TO GUIBERSON CORPORATION, OF DALLAS, TEXAS, A CORPORATION OF DELAWARE.

BLEEDER FOR LIQUID-STORAGE TANKS.

Application filed February 23, 1924. Serial No. 694,806.

*To all whom it may concern:*

Be it known that I, CHARLES S. CRICKMER, a citizen of the United States of America, residing at Dallas, in the county of Dallas and State of Texas, have invented certain new and useful Improvements in Bleeders for Liquid-Storage Tanks, of which the following is a specification.

This invention relates to new and useful improvements in bleeders for liquid storage tanks.

Many liquids such as crude oil contain water and when stored in tanks this water collects at the bottom of the tank and builds up a residue or offal, which is frequently sucked up by the pump in removing the oil or liquid from the tank.

The object of the invention is to provide means for automatically draining the accumulated water from the bottom of the tank in a simple and expeditious manner.

A further object of the invention is to utilize the molecular adhesion or viscosity of the oil or other liquid as compared with the greater specific gravity or weight of water or equivalent liquid, together with the lesser viscosity of the water; whereby the oil floats upon the water and the latter seeps through or penetrates a seal set up by the oil.

Another object of the invention is to provide means for bleeding water from more viscous liquids, which includes spaced correlated surfaces inclined sufficiently to afford drainage and a gradual precipitation of water through the molecules of the more viscous or adhering liquid, which latter, owing to the proximity of the inclined surfaces, build up by adhesion and seal the passage against a discharge or flow of the more viscous or less fluent liquid.

A further object is to provide a restricted inclined channel of sufficient length to give the molecules of the oil opportunity to check the downward flow of the oil by adhering to the walls of the channel and building up a seal or oil gate, which prevents the escape of the oil, but which is penetrated by the water owing to its greater specific gravity and fluidity.

A still further object is to provide a bleeder of the character described which includes means for adjusting the channel surfaces with relation to each other and in accordance with the viscosity of the less fluent liquids.

Another object of the invention is to provide means having inclined conical surfaces of sufficient amplitude to form a molecular seal and permit an adequate drainage of the water.

A further object is to provide a bleeder having a plurality of conical members and means for centering the members in concentric relation and uniformly spacing their correlated inclined surfaces.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a longitudinal sectional view of a bleeder constructed in accordance with my invention, Fig. 2 is a cross-sectional view on the line 2—2 of Fig. 1, Fig. 3 is a cross-sectional view on the line 3—3 of Fig. 1, Fig. 4 is an enlarged sectional detail, Fig. 5 is a partial elevation of a modified form of a core, Fig. 6 is a cross-sectional view on the line 6—6 of Fig. 5, Fig. 7, is a view partly in section and partly in elevation of another form of bleeder, Fig. 8 is an end view of the same, a portion being shown in section, Fig. 9 is a broken elevation of one of the core sleeves, Fig. 10 is an enlarged cross-sectional view on the line 10—10 of Fig. 7, Fig. 11 is a sectional view of still another form, Fig. 12 is a cross-sectional view on the line 12—12 of Fig. 11, Fig. 13 is a sectional view of a modification of the form shown in Fig. 11, Fig. 14 is a cross-sectional view on the line 14—14 of Fig. 13, and Fig. 15, is a detail showing the bleeder connected to the tank.

In the drawings the numeral 10 designates an elongated conoidal housing having a reduced collar 11 at its upper end and an annular flange 12 at its lower end, both externally screw threaded. An annular shoulder 13 is provided at the base of the collar and a joint 14 screwed on the collar engages the shoulder and lies flush with the housing. The joint has a screw threaded socket 15 at its upper end for receiving a pipe 16, which as is shown in Fig. 15, is connected with a horizontal pipe 17 leading from the bottom of a storage tank 18.

An annular cap or receptacle 19 is screwed onto the flange 12 and has a depending axial shank 20. The shank is bored and has an internal stuffing box flange 21, above which it is screw threaded. A gland nut 22 is mounted on the shank and has a follower engaging in the stuffing box. A stem 23 extends through the shank and has screw threads 24 engaging in the screw threads of the shank. The stem supports a circular disk 25 having a turning fit in the flange 12 and provided with vertical ducts 26 in its periphery.

The disk is surmounted by a reduced boss 27 on which is mounted a conical core member 28 having its surface contiguous to and parallel to, the inner surface of the housing. The core has a trunnion 29 at its upper end having a rotating fit in the collar 11. By turning the stem 23 the core is raised or lowered and moved toward or from the inner surface of the housing, whereby the space therebetween is varied and regulated. The screw threads 24 and the trunnion 29 maintain the core on its vertical axis, so that the adjacent surfaces of the core and housing remain parallel during adjustments.

The trunnion has a central well 30 from the bottom of which radial ports 31 extend through the trunnion. The housing just above the core at its intersection with the collar, has an annular groove 32 surrounding the ports. A drain pipe 33 leads from the bottom of the cap 19 within the flange 12. The disk 25 is normally spaced above the bottom of the cap.

The device operates as follows:

A hole is dug in the ground at the bottom of the tank, 18 (Fig. 15) and the pipe 17 is tapped into the tank so as to drain the bottom thereof. The vertical pipe 16 being connected to the pipe 17, the joint 14 is screwed onto the lower end of the pipe 16 and the bleeder is thus suspended in the hole below the bottom of the tank. It will be apparent that the liquid will flow from the bottom of the tank through the pipes 16 and 17 into the well 30 of the trunnion 29. The liquid from the well passes through the ports 31 into the groove 32.

If the flow is from a crude oil tank the liquid will comprise oil and water. As oil tends to float upon water, it will be seen that the water will collect at the bottom of the tank and therefore will flow with a proportion of oil and residue, to the bleeder. When this liquid enters the restricted space between the inner surface of the housing 10 and the core 28, the molecules of the oil will adhere to the surfaces and bridge the space, thus forming a seal; therefore I have called this space a "seal" chamber or channel. Owing to the inclination of the channel and the molecular adhesion of the oil, the downward movement of the oil will be checked sufficiently to prevent any appreciable leak at the bottom. The water being heavier and less adhesive liquid, will seep through the oil seal and drain from the lower edge of the core. By reason of the reduced boss, a drip edge is provided at the bottom of the core and the water falls onto the disk 25 from which it escapes through the ducts 26. Water passing through the ducts into the cap 19 is carried off through the pipe 33. If a discharge of oil is shown the stem 23 may be turned to adjust the core and reduce the seal chamber or if the water is not freed a reverse adjustment may be made. It is also possible to move the core into contact with the inner surface of the housing and thus provide a cut-off valve.

In Figs. 7 to 10 inclusive, I have shown another form in which is provided a housing having a cylindrical lower portion 40 and a conical upper portion 41. The conical portion 41 is merged into a collar 42 and the cylindrical portion 40 has an outwardly directed flange 43 at its lower end. An annular trough 44 has an outwardy directed flange 45 fastened to the underside of the flange 43 by bolts 46. The trough has an outlet 47 into which a discharge pipe (not shown) may be screwed.

A truncated conical core 48 extends upwardly from the inner edge of the trough into the portion 40 of the housing. The inclined surface of the core is parallel of the portion 41 of the housing. A plurality of truncated conical sleeves 49 are nested within each other and supported on the core. These sleeves are provided with spacing bosses 50 on their outer surfaces and the core 48 has like bosses 50'. These bosses are adjacent the upper and lower ends of the parts and space them at the same distance, the bosses on the upper sleeve engaging the inner surface of the conical portion 41 of the housing.

The sleeves are of such length as to terminate within the conical portion 40 of the housing in juxtaposition thereto. The upper end of the core is closed and forms the bottom of a well 51 extending up through the center of the sleeves. The space between each pair of sleeves opens to the well and liquids from the pipe 16 screwed into the collar 42 in flowing down said well, enter the openings to the seal chambers and flow down said sleeves. The spaces between the sleeves are controlled by the projections of the bosses and the proportions of the housing. The viscous molecules seal the spaces and the water seeps through and drips into the trough 44. An adjustment may be made by replacing the core with one greater or less height carrying sleeves with the spacing required.

In Figs. 11 and 12 I have illustrated another form comprising a truncated conical housing 60 which is made with less inclination than the other forms, and has a shank 61 at its upper end surmounted by a collar 62 internally screw threaded to form a socket to receive the pipe 16. The shank has a plurality of vertical ports 63 surrounding a central screw threaded opening 64. A truncated conical core 65 has a screw threaded trunnion 66 engaging in the opening 64. A handle stem 67 depends from the center of the core. The surface of the core is concentric to the inner surface of the housing and by rotating the core, by means of the handle stem 67, it is adjusted with relation to the housing, whereby the seal channel or chamber is regulated.

The upper surface 68 of the core is dished so that the liquid may pass freely over the edge of the core and down the sides of the latter. The liquid enters through the collar 62 and flows down through the ports 63 to the dished surface 68 from which it overflows into the space between the core and the housing, the oil sealing and the water seeping through and dripping from the lower edge of the core.

A further modification is shown in Figs. 13 and 14 in which the same parts are used with the exception of a longer stem 66'. Between the core and the housing a plurality of nested truncated conical sleeves 69 are provided. All of the sleeves have spacing bosses 70 on their under surfaces, similar to the bosses 50, whereby they are supported and spaced from the core and each other. The uppermost sleeve has bosses 71 on its upper surface spacing it from the inner surface of the housing.

In Fig. 6 I have shown the core 28 provided with circumferential grooves 72 spaced apart at suitable intervals. These grooves form sumps for the more viscous molecules of the oil or other liquid from which water or heavier liquid is being separated. These grooves can be used to advantage for checking any downward passage of the oil, which results in a leak. Light bodied oils may be held in this manner and an effectual seal may be had with greater spacing of the parts.

While oil and water have been referred to, the invention may be used wherever the liquid to be drained out has greater specific gravity and less viscosity than the liquid which is to be retained.

Various changes in the size and shape of the different parts, as well as modifications and alterations may be made within the scope of the appended claims.

What I claim, is:

1. In a tank bleeder, a housing having an inclined inner wall, and a member having an inclined outer wall contiguous to the inner wall of the housing to form a seal channel therebetween.

2. A tank bleeder comprising two members with an inclined seal channel therebetween for bleeding a heavier liquid from a more viscous liquid, said members being spaced in such relation as to utilize the specific gravity molecular adhesion of the more viscous fluid to bridge and seal the channel therebetween and to permit the heavier liquid to seep through said channel and escape.

3. A tank bleeder comprising two members with a seal channel therebetween for bleeding a heavier liquid from a more viscous liquid, said members being spaced in such relation as to utilize the molecular adhesion of the more viscous fluid to bridge and seal the channel therebetween and to permit the heavier liquid to seep through said channel and escape, and means for adjusting one of said members with relation to the other to vary the transverse space between the members and to vary the depth of the channel in accordance with the viscosity of the less fluent liquid.

4. A tank bleeder comprising two members having parallel inclined adjacent surfaces, said members being spaced in such relation as to utilize the molecular adhesion of a viscous liquid passing down said inclined surfaces to seal the space between said members against the escape of said viscous liquid but to permit a heavier and less viscous liquid to seep through and escape.

5. A tank bleeder comprising two members having parallel inclined adjacent surfaces, said members being spaced in such relation as to utilize the molecular adhesion of a viscous liquid passing down said inclined surfaces to seal the space between said members against the escape of said liquid but to permit a heavier and less viscous liquid to seep through and escape, and means for adjusting one of the members with relation to the other to vary the space therebetween.

6. In a tank bleeder, a housing having a maximum opening at its upper end, and provided with a downwardly gradual increasing seal channel having the same transverse area from top to bottom.

7. In a tank bleeder, a housing having an inlet at its upper end, said housing having an inclined inner surface, and means within the housing having an inclined surface parallel to the inclined surface of the housing and spaced in such close relation thereto as to be bridged by the adhesion of the molecules of a viscous fluid.

8. In a tank bleeder, a housing having an inlet at its upper end, said housing having an inclined inner annular surface, and a member within the housing having an inclined surface concentric within the said annular portion of said housing and spaced in juxtaposition thereto.

9. In a tank bleeder, a housing having an inlet at its upper end and provided with an inclined annular portion below said inlet, and an inclined annular member disposed concentrically within the inclined annular portion of the housing and co-acting with said inclined portion to form a seal channel therebetween.

10. In a tank bleeder, a housing having a conical portion, and a conical member fitting concentrically within the conical portion of the housing so as to provide a conical space between the housing and the member.

11. In a tank bleeder, a housing having a conical portion, a conical member fitting concentrically within the conical portion of the housing, and means for spacing the conical member from the housing to regulate the space therebetween.

12. In a tank bleeder, a housing having a collar at its upper end for attachment to a suspending pipe, said housing having a conical portion below the collar, and a conical core concentrically disposed within the housing and co-acting with the conical portion of the housing to form a seal channel therebetween.

In testimony whereof I affix my signature.

CHARLES S. CRICKMER.